(12) United States Patent
Deason et al.

(10) Patent No.: US 7,180,761 B2
(45) Date of Patent: Feb. 20, 2007

(54) CONSTANT VOLTAGE CONTROL APPARATUS CAPABLE OF REDUCING FEEDBACK LINES

(76) Inventors: Mike T. Deason, 2820 Commerce Blvd., Birmingham, AL (US) 35210; Nam-Hoon Lee, 2-407 Seongchang APT., 999-2 Unyang-dong, Gimpo, Kyeonggi-do 415-742 (KR)

( * ) Notice: Subject to any disclaimer, the term of this patent is extended or adjusted under 35 U.S.C. 154(b) by 202 days.

(21) Appl. No.: 10/949,439

(22) Filed: Sep. 24, 2004

(65) Prior Publication Data

US 2006/0034110 A1    Feb. 16, 2006

(30) Foreign Application Priority Data

Aug. 10, 2004   (KR)  ............. 10-2004-0062896

(51) Int. Cl.
*H02M 5/42*   (2006.01)
*G05F 1/40*   (2006.01)

(52) U.S. Cl. .............. 363/79; 363/266; 363/274
(58) Field of Classification Search ........... 363/74, 363/78, 79; 323/205, 266, 274, 275, 280
See application file for complete search history.

(56) References Cited

U.S. PATENT DOCUMENTS

| 5,408,173 A | * | 4/1995 | Knapp ........................ 363/79 |
| 5,559,422 A | * | 9/1996 | Fahrenkrug et al. ........ 323/221 |
| 5,847,944 A | * | 12/1998 | Jang et al. .................... 363/44 |

* cited by examiner

*Primary Examiner*—Jessica Han
(74) *Attorney, Agent, or Firm*—St. Onge Steward Johnston & Reens LLC

(57) ABSTRACT

Provided is a constant voltage control apparatus capable of reducing feedback lines. In the constant voltage control apparatus, a first amplifier amplifies an output voltage applied to a pair of output terminals. A second amplifier amplifies a voltage drop between one of the output terminals and a load terminal connected thereto. A third amplifier amplifies output voltages from the first and second amplifiers, respectively. Comparing means receive an output voltage from the third amplifier and a reference voltage, and output an output voltage which makes a sum of the output voltage and the reference voltage of the third amplifier become zero. A triac drive unit amplifies the output voltage from the comparing means to control a triac installed on a power line that is connected with the first output terminal.

3 Claims, 2 Drawing Sheets

US 7,180,761 B2

CONSTANT VOLTAGE CONTROL APPARATUS CAPABLE OF REDUCING FEEDBACK LINES

This application claims priority of pending Korean Patent Application No. 2004-62896 filed on Aug. 10, 2004.

FIELD OF THE INVENTION

The present invention relates to a constant voltage control apparatus capable of reducing the number of feedback lines. More particularly, the present invention relates to a constant voltage control apparatus capable of reducing the number of feedback lines, which are built-in and inserted into an output cable employed in an electrofusion fitting to constitute a constant voltage circuit, thereby reducing the volume and weight of the output cable.

DESCRIPTION OF THE RELATED ART

An electrofusion machine was developed for bonding or branching a gas pipe or a water supply and drainage pipe having polyethylene- or ethylene-based copolymer as a main raw material.

To bond two polyethylene pipes using the electrofusion machine, a polyethylene bonding material having a heating wire or heating element therein is placed on a bondage surface between the polyethylene pipes and a fitting, each of the two polyethylene pipes is inserted into both ends of the fitting, and current is supplied to the heating wire or heating element, so that heat is generated from the heating wire or heating element and thus inner surfaces of the fitting and outer circumferences of the pipes are bonded to each other by melting expansion and compression.

Since it is required to keep the external power applied to the electrofusion type fitting at a constant level, a constant voltage control apparatus is generally used for the fitting.

FIG. 1 is a circuit diagram of a constant voltage control apparatus of the related art.

When a power is applied to a pair of power input terminals 10 and 10a, a triac 15 controllably outputs a voltage via output terminals 20 and 20a. Then, the output voltage is supplied via an output cable 100 and load terminals 30 and 30a to an electrical load 40 such as an electrofusion fitting.

In this case, the output voltage applied to the output terminals 20 and 20a is amplified by a first OP amplifier 50 at a predetermined ratio, and then applied to an inverting terminal of a second OP amplifier 60.

A reference voltage 15 is applied to a non-inverting terminal of the second OP amplifier 60, and the second OP amplifier 60 outputs a voltage which is so set to make zero when added to the reference voltage 15.

A triac drive unit 70 amplifies the output voltage from the second OP amplifier 60 to control the on/off of the triac 15.

This process is repeated to supply a stabilized voltage to the load terminals 30 and 30a via the output cable 100.

In this case, however, conductors of the output cable 100 have a predetermined resistance even though it is insignificant so that any current flowing through the cable 100 induces a voltage drop.

Of course, the resistance may be disregarded if the current is insignificant or the conductors are significantly short and thick. However, the resistance is not disregardable in practice.

For example, when an output voltage of about 40V is applied through an output cable 100 having a thickness of about 5 mm$^2$ and a length of about 5 m to a load 40 having a resistance of about 1, current of about 40 A flows through conductors of the output cable 100 to create a voltage drop of about 1.5V. This as a result induces a voltage difference of about 3V between the output terminals 20 and 20a and the load terminals 30 and 30a.

FIG. 2 is a circuit diagram illustrating another constant voltage control apparatus of the prior art, which is proposed solve the problem of the above conventional constant voltage control apparatus.

In this constant voltage control apparatus, a voltage is applied to a first OP amplifier 50 via feedback terminals 80 and 80a connected with load terminals 30 and 30a, respectively, rather than output terminals 20 and 20a. Feedback lines are provided to connect the input terminals 30 and 30a with the feedback terminals 80 and 80a, respectively, in which the internal resistance of the feedback lines can be disregarded since very weak signals flow through the feedback lines.

The advantage of this structure is that it can provide a more stabilized voltage. However, there are also problems in that two feedback lines are added inside an output cable 100 thereby increasing the volume and weight of the output cable 100.

In particular, since a number of control lines for temperature detection and other functions are placed in the output cable, it is troublesome to additionally insert the two feedback lines into the output cable.

SUMMARY OF THE INVENTION

Accordingly, the present invention is directed to a constant voltage control apparatus that substantially obviates one or more problems due to limitations and disadvantages of the related art.

An object of the present invention is to provide a constant voltage control apparatus that can realize the same effect as conventional apparatuses while reducing the number of feedback lines.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Hereinafter a preferred embodiment of the present invention will be described in detail with reference to the accompanying drawings.

Figure 1:
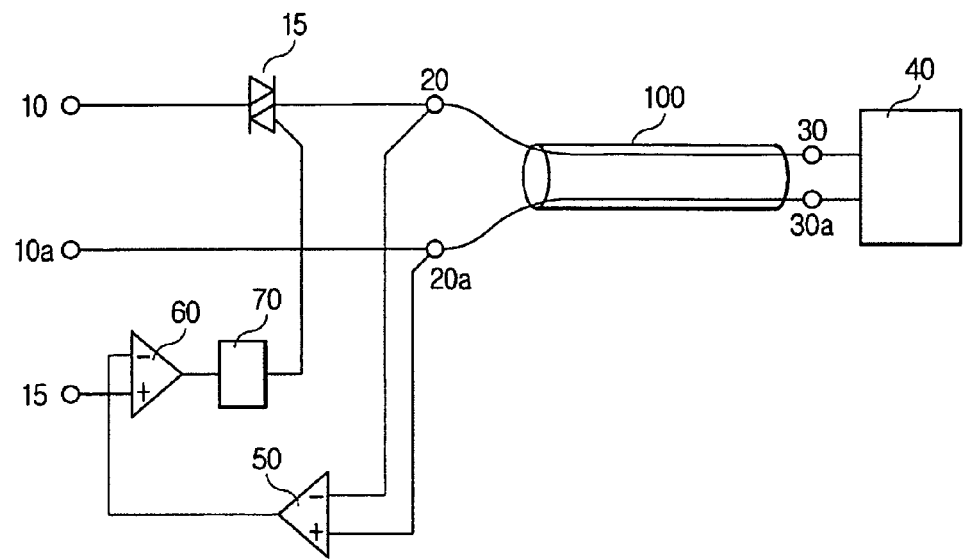
FIG. 1 is a circuit diagram illustrating a constant voltage control apparatus of the prior art.
Figure 2:
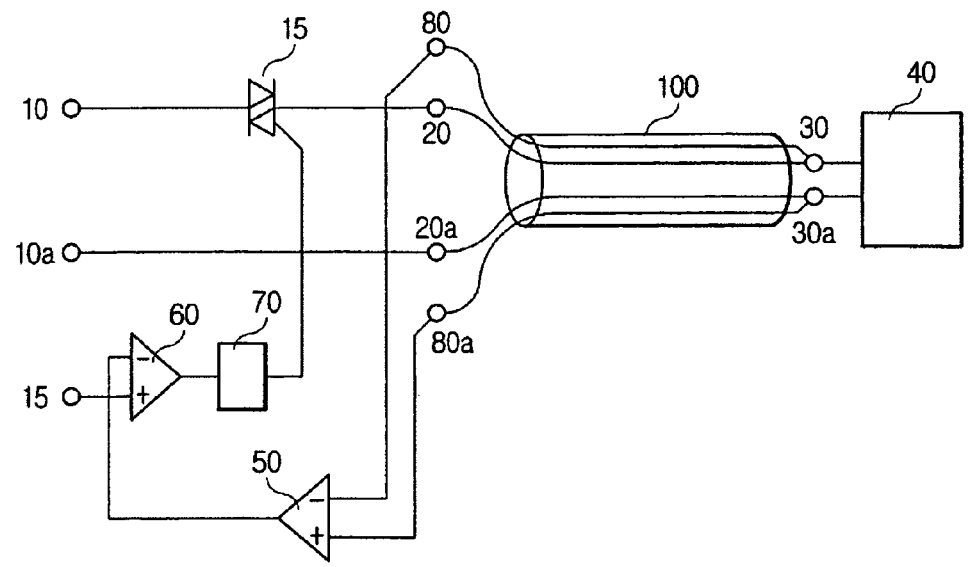
FIG. 2 is a circuit diagram of another constant voltage control apparatus of the prior art.
Figure 3:
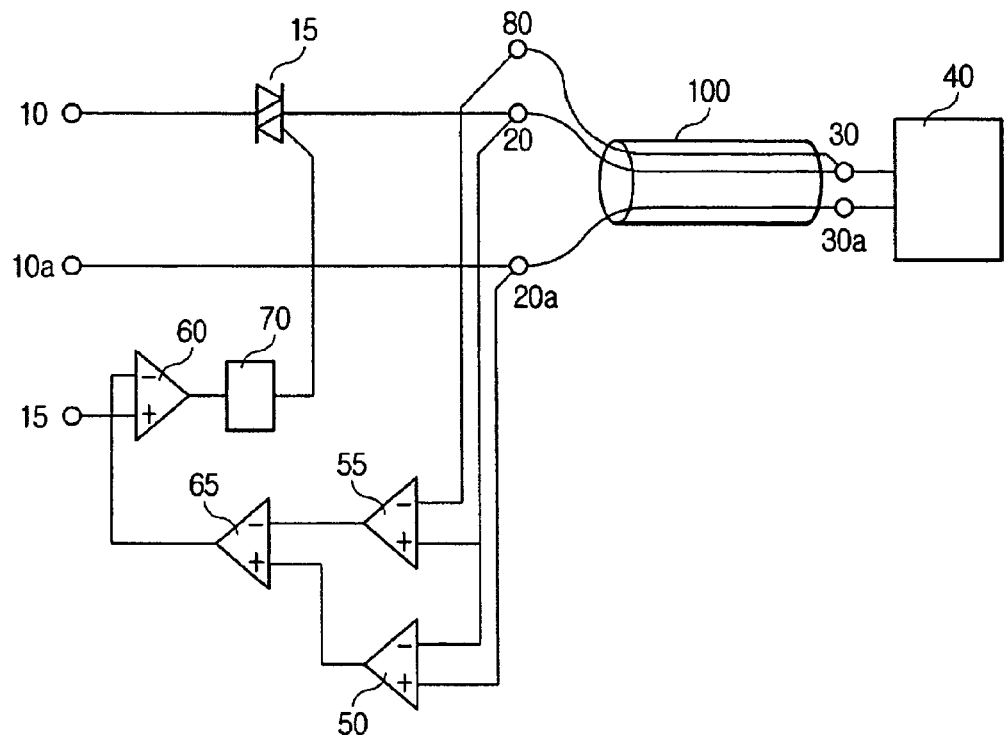
FIG. 3 is a circuit diagram of an apparatus for controlling constant voltage according to a preferred embodiment of the present invention.

FIG. 3 is a circuit diagram of a constant voltage control apparatus according to a preferred embodiment of the present invention.

When a pair of power input terminals 10 and 10a are powered, a triac 15 controllably outputs a voltage via output terminals 20 and 20a. Then, the output voltage is supplied via an output cable 100 and load terminals 30 and 30a to an electrical load 40 such as an electrofusion fitting.

A feedback line for connecting a load terminal 30 with a feedback terminal 80 is inserted into the output cable 100.

A first OP amplifier 50 amplifies the output voltage applied to the pair of output terminals 20 and 20a, and a second OP amplifier 55 receives and amplifies voltages applied to the output terminal 20 and a feedback terminal 80, respectively. In this way, any voltage drop between the output terminal 20 and the load terminal 30 is amplified.

While it is illustrated in this embodiment that the voltage drop between the output terminal and the load terminal 30 is amplified, any voltage drop between the output terminal 20a and the load terminal 30a can be amplified on the same basis. Preferably, the voltage drop is doubled since the output terminals 20 and 20a have the same value of voltage drop.

Output voltages from the first and second OP amplifiers 50 and 55 are applied to non-inverting and inverting terminals of a third OP amplifier 65, respectively, and the Op amplifier 65 amplifies the output voltages. A resultant value produced from the applied output voltages becomes the same as the value measured at the load terminals 30 and 30a.

Accordingly, the present invention can obtain the same result from a single feedback line as from two conventional feedback lines.

A comparator unit 60 receives an output voltage from the third OP amplifier 65 and a reference voltage 15, and outputs an output voltage which makes a sum of the output voltage and the reference voltage 15 of the third OP amplifier 65 become zero which is so set to make zero.

The triac drive unit 70 amplifies the output voltage from the comparator unit 60 to control the on/off of the triac 15 installed on a power line which is connected with the output terminal 20.

As described hereinbefore, the present invention has an advantage in that it can provide constant voltage control in the same level as the prior art while reducing the number of feedback lines inserted into the output cable.

Furthermore, there is an advantage in that reduction of one feedback line accordingly decreases the volume and weight of the output cable thereby reducing the entire size of the control apparatus.

While the present invention has been shown and described in connection with the preferred embodiments, it will be apparent to those skilled in the art that modifications and variations can be made without departing from the spirit and scope of the invention as defined by the appended claims.

What is claimed is:

1. A constant voltage control apparatus capable of reducing feedback lines, comprising:
    a first amplifier for amplifying an output voltage applied to a pair of output terminals;
    a second amplifier for amplifying a voltage drop between one of the output terminals and a load terminal connected thereto;
    a third amplifier for amplifying output voltages from the first and second amplifiers, respectively;
    comparing means for receiving an output voltage and a reference voltage of the third amplifier and outputting an output voltage which makes a sum of the output voltage and the reference voltage of the third amplifier become zero; and
    a triac drive unit for amplifying the output voltage from the comparing means to control On/Off of a triac installed on a power line that is connected with the first output terminal.

2. The constant voltage control apparatus according to claim 1, wherein the second amplifier doubles the voltage drop.

3. An apparatus for automatic electrofusion of an electrical socket, comprising:
    a controller having a pair of voltage input terminals, a constant voltage control unit and a pair of output terminals; and
    an output cable connecting the controller with an electrofusion fitting to supply a power to the electrofusion fitting,
    wherein the output cable has a single feedback line inserted therein, for connecting a feedback terminal with a fitting-side terminal which is connected with one of the output terminals,
    wherein the control unit includes:
    a first amplifier for amplifying an output voltage applied to the pair of output terminals;
    a second amplifier for amplifying a voltage drop between one of the output terminals and a load terminal connected thereto;
    a third amplifier for amplifying output voltages from the first and second amplifiers, respectively;
    comparing means for receiving an output voltage and a reference voltage of the third amplifier and outputting an output voltage which makes a sum of the output voltage and the reference voltage of the third amplifier become zero; and
    a triac drive unit for amplifying the output voltage from the comparing means to control a triac installed on a power line that is connected with the first output terminal.

* * * * *